Oct. 7, 1958  J. F. ENGLISH, JR  2,855,492
BOLOMETER
Filed March 7, 1955  3 Sheets-Sheet 1

INVENTOR.
JAMES F. ENGLISH JR.
BY
Raymond W. Junkins
ATTORNEY

Oct. 7, 1958

J. F. ENGLISH, JR 2,855,492

BOLOMETER

Filed March 7, 1955

*INVENTOR.*
JAMES F. ENGLISH JR.
BY
*Raymond W. Jenkins*
ATTORNEY

Oct. 7, 1958 J. F. ENGLISH, JR 2,855,492
BOLOMETER
Filed March 7, 1955 3 Sheets-Sheet 3
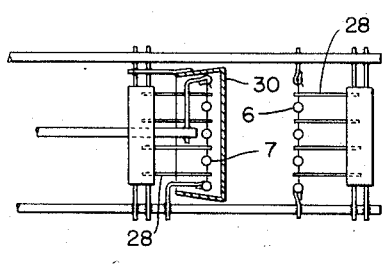
FIG. 7
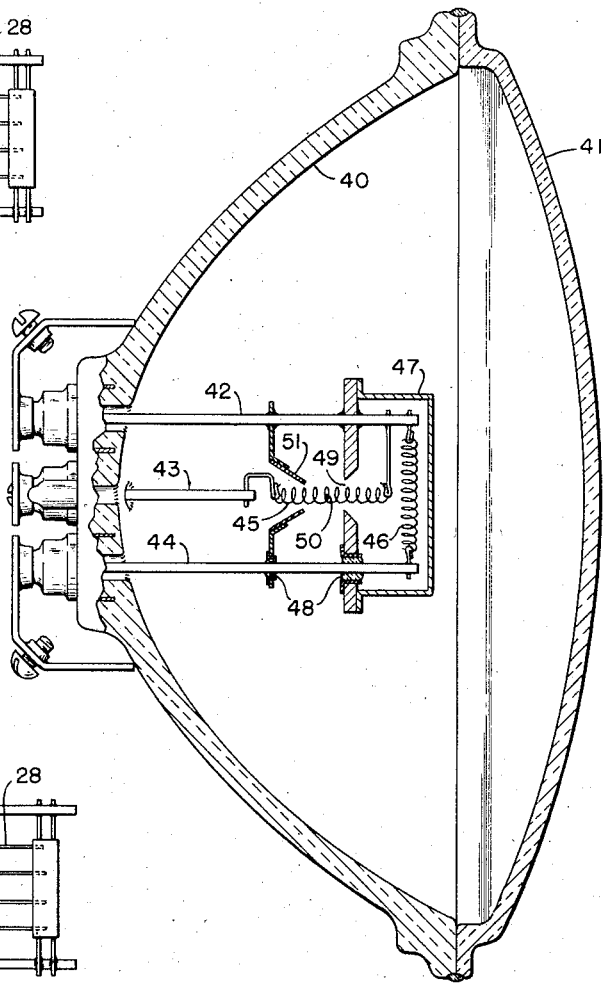
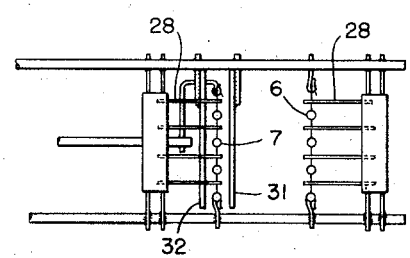
FIG. 8
FIG. 10
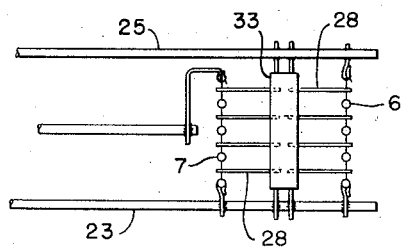
FIG. 9
*INVENTOR.*
JAMES F. ENGLISH JR.
BY
Raymond W. Junkins
*ATTORNEY*

United States Patent Office 2,855,492
Patented Oct. 7, 1958

2,855,492

BOLOMETER

James F. English, Jr., Lakewood, Ohio, assignor to Bailey Meter Company, a corporation of Delaware Application March 7, 1955, Serial No. 492,568

10 Claims. (Cl. 201—63)

The present invention is directed to improvements in radiometric devices sensitive to total thermal radiant energy which they intercept, regardless of wave length. The device is to be included as the primary element of a measuring system. The including system may perform some function or operation in response to a particular band of wave length radiation, but the device is not inherently limited, in response, to any particular band of radiation.

In reference to thermal radiation, I define that radiation as emitted by a body or substance, usually only by solids or liquids, whose quantity or quality depends mainly on the temperature and emissivity of the body or substance. The spectral distribution of the radiation emitted is continuous and changes smoothly with temperature. For any selected temperature and emitting body, the special distribution of the radiation may simultaneously include infrared, visible, and untraviolet regions.

A common term applied to my improved device is "bolometer." In general, the bolometer is defined as a device sensitive to total thermal radiation for producing an effect representative of the energy level of radiation which it intercepts. More specifically, I limit my definition of the bolometer to that of the electric resistance type wherein the change in temperature of the target due to receipt of radiant energy varies the electric resistance of the target. From one viewpoint, the bolometer is an electrical resistance thermometer of the A.-C. type.

A general object of the invention is to provide an improved bolometer universally sensitive to thermal radiant energy.

Another object is to provide an improved bolometer which includes a circuit element, companion to the target, both to be included in the balanceable electric network of a measuring system.

Another object of the invention is to provide within a single structure a bolometer containing a plurality of circuit elements of a balanceable network arranged to be exposed to similar ambient conditions.

A further object of the invention is to provide a bolometer with a target receiving radiation from a limited emissive body area.

In the drawings:

Fig. 1 diagrammatically shows a measuring circuit in which the device embodying the invention is included.

Fig. 7 is a side elevation of another form of shield.

Fig. 8 is a side elevation of another form of shield.

Fig. 9 is a side elevation of common support structure for the elements.

Fig. 10 is a side elevation of the device including another form of shield.

Figure 1:
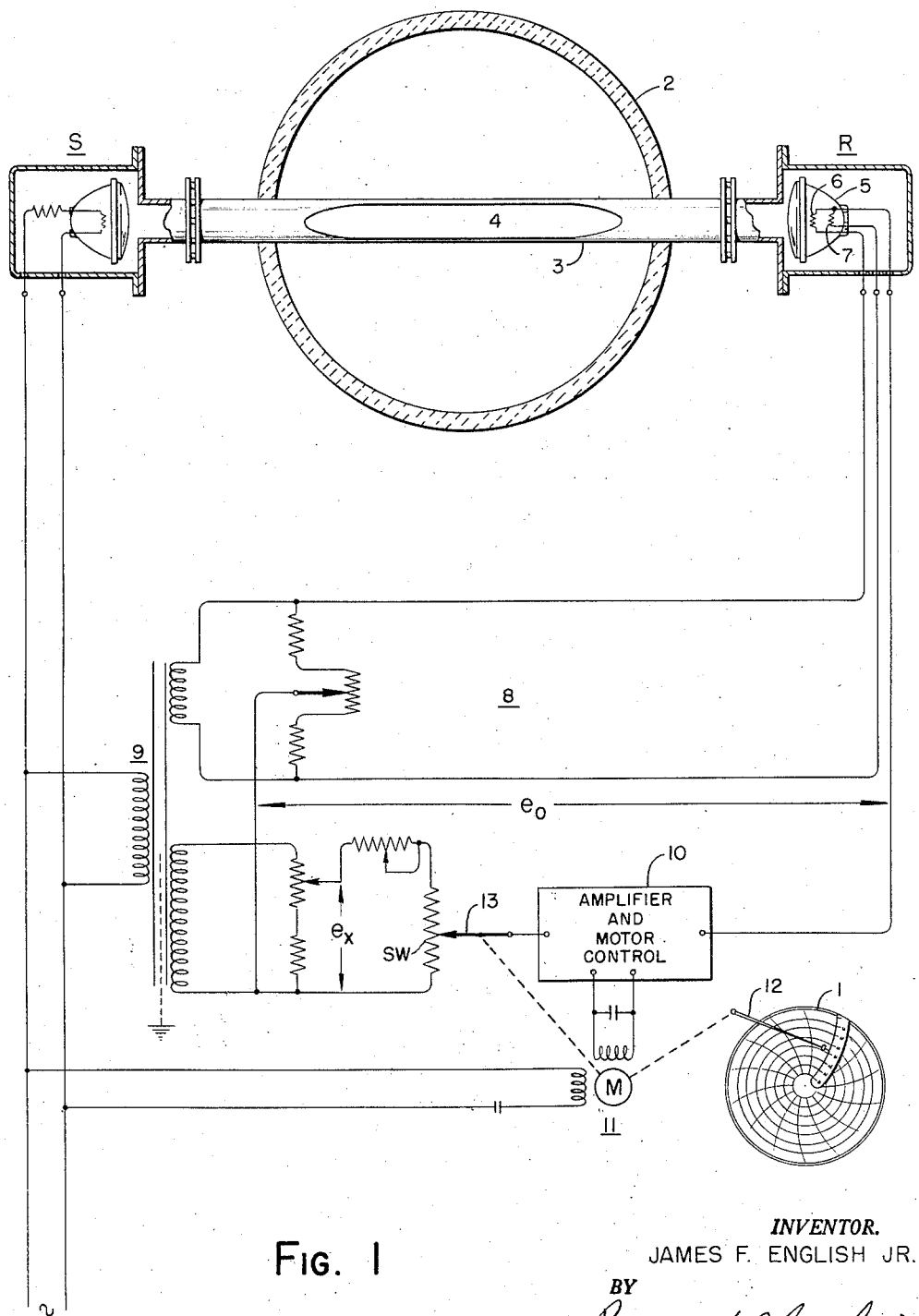

Turning first to Fig. 1, I show, in quite diagrammatic form, one type of measuring system in which my improved bolometer may be utilized as a primary element. In general, the system operates to form a continuous record upon chart 1 of the smoke content of products of combustion passing through a stack 2. The stack 2 is traversed by a radiation path tube 3 with a slot 4 maintaining a sample stream of uniform cross section through which a quasi collimated beam of radiation may be directed longitudinally through tube 3 from a source S to a receiver R.

The measuring system responds to the variations in the percentage of thermal radiation from the source which reaches a target at the receiver after passing through the path of fixed dimension in which is flowing a sample aerosol stream of the products of combustion bearing radiation absorbing, or obstructing materials. The bolometer, containing the target at the receiver, responds to that radiation to which it is exposed at the receiver, regardless of the wave length of the radiation. Obviously there are many factors which control the percentage of radiation to which the bolometer is exposed. Size of stack 2 and strength of the radiation source S are examples of the various factors that enter into the relationship between the amount of thermal radiation given off by the source and that which is received by the target of the bolometer. These problems, however, are incidental to those of the present invention surrounding the construction and arrangement of the bolometer as a primary element.

In general, the bolometer 5 contains a target resistance 6 and a compensating resistance 7 as legs of an A.-C. bridge network 8 supplied with A.-C. voltage from the secondary winding of a transformer 9. The output of the network 8 appears as an A.-C. voltage $e_o$ representative of the amount of thermal radiation received by the target 6. Of course, it is normally preferred that, without smoke, maximum reception by target 6 of thermal radiation from source S is indicated whereas 100% smoke means complete obstruction of the radiation and, therefore, minimum radiation reception by the target 6.

In the measuring system, A.-C. voltage $e_o$ is compared to A.-C. voltage $e_x$. Differences between these two voltages are applied to amplifier and motor control 10 for actuating a motor 11 in proper direction and amount to move an indicating-recording pen 12 relative to the chart 1. Simultaneously, motor 11 positions a contact 13 along a balancing slidewire SW for reducing the difference between voltages $e_o$ and $e_x$ to zero and bring the system into electrical balance.

In an actual reduction to practice of this system, a source of thermal radiation at S may take the form of a commercial spotlight of about 200 watts having a mirrored reflector concentrating the thermal radiation in the path longitudinally defined through tube 3 in the direction of receiver R. It is commonly appreciated that the radiation from such a source has a total distribution of wave length falling in the ultraviolet, visible and infrared regions. In general, with sources of 100 watts and greater, roughly 75% of the radiation falls in the infrared region. This distribution is interesting, from certain aspects, but it is to be kept in mind that all of the radiations, having various wave lengths, are brought to the target 6, within bolometer 5, for varying its electrical resistance.

The specific construction of the improved bolometer provides target 6 with radiation of all wave lengths brought into the bolometer. However, it is next to be appreciated that target 6, as a circuit element of network 8, has a companion circuit element 7. Network 8 is essentially a conventional Wheatstone bridge with adjacent and opposite resistance legs. It is essential that the two pairs of opposite legs be exposed to similar ambient conditions or their resulting change in resistance will vary the magnitude of voltage $e_o$ independently of the variable measured.

To preserve equality of response to ambient conditions, the present invention brings target 6 and compensating resistance 7, one of the two pairs of adjacent Wheatstone bridge 8 legs, together in the housing of bolometer 5. By further specific construction and arrangement of the elements of this preferred embodiment of the invention, the compensating resistance element 7 is isolated from the radiation to which the bolometer is exposed while simultaneously varying in ambeint temperature with target 6. The result is a bolometer which is improved in performance, as a primary element of systems such as 8, while eliminating the necessity of dual mountings for these circuit elements with their problems of response to common ambient conditions. The unitary mounting provides an article of manufacture which is cheaper and more simple to produce than the plurality of mountings otherwise necessary.

Figure 2:
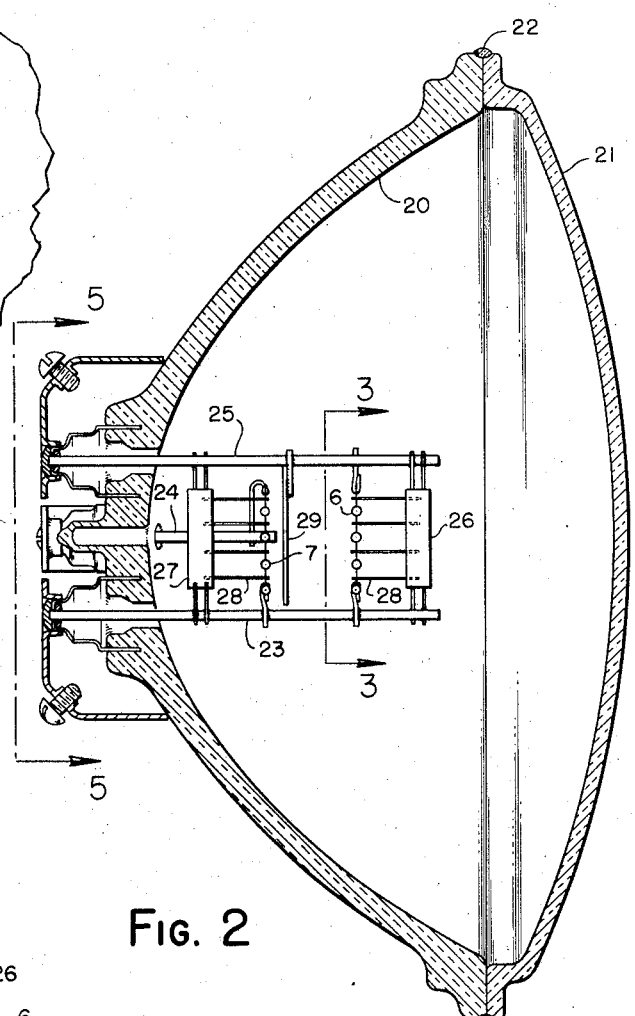
Fig. 2 is a side elevation of a preferred form of the device.

Turning now to Fig. 2, it will be seen that the bolometer of the invention includes a glass housing consisting of two parts. An internally mirrored paraboloidal reflecting section 20 is joined with a window section 21 through a seal structure 22. The resulting housing is evacuated of air. At the focal center, in the plane of the latus rectum of the paraboloidal reflecting surface of section 20, is mounted the target resistance 6.

With target resistance element 6 mounted to span the focal center, several hundred times the radiant energy that would otherwise be received by direct impingement alone upon the target is caused to vary the electrical resistance of the element. In this embodiment, no attempt has been made to concentrate the target to an extremely small area at a theoretical focal point of a true parabolic mirror. To begin with, the paraboloidal reflecting surface would have to be a very accurately formed parabola to narrow the size of the focal center. These requirements would not allow for irregularities in the reflecting surface due to manufacturing variables. The expense of providing a reflecting surface of this quality, along with the manufacturing difficulties of locating a concentrated target relative to the exact focal point, would establish a prohibitive per unit cost for these devices. The present arrangement of extending the length of the target resistance over an area of some size allows reception upon the target 6 of reflected radiation from a commercially formed paraboloidal surface or from a surface which may purposely be distorted away from a true paraboloidal shape. It is quite possible that it may be desirable to purposely distort the curvature of the surface 20 so that the concentration of reflected radiant energy is not at a theoretical point but over a determinable area encompassed by the complete span of the target resiatance wire 6.

The physical supports for, as well as the electrical connections to, both target resistance 6 and compensating resistance 7, are indicated by terminal posts 23, 24 and 25. These posts extend through the rear wall of reflecting section 20, and are rigidly held with respect thereto, by the sealing structure shown in section. Individual, electrical, connections may be made to these terminal posts, external of the housing. As support structure, posts 23, 24 and 25 suspend structural bridges 26 and 27 of lavite, spaced along their lengths. Numerous support posts 28 are embedded in these structural bridges and assist in specifically arranging the reaches of the resistance wires in their respective planes.

Electrical connections are consummated between the terminal posts and the target and compensating resistance wires. Post 23 is a common electrical connection, while the other ends of each wire are individually taken to posts 24 and 25.

Figure 3:
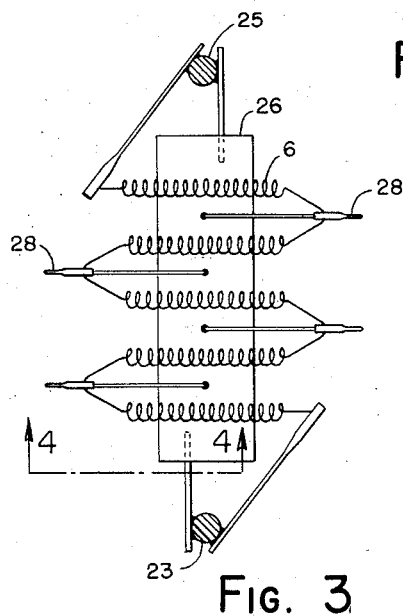
Fig. 3 is a view of a portion of the device in the direction of the arrows 3—3 of Fig. 2.
Figure 4:
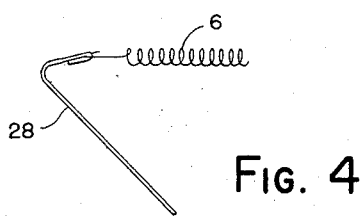
Fig. 4 is a view of an element and support post in the direction of the arrows 4—4 of Fig. 3.

The arrangement of target resistance wire 6, as a representative for both wires, is depicted in Fig. 3, looking along lines 3—3 in Fig. 2. Common terminal post 23 and post 25 are discerned as electrically connected to the resistance wire which is a considerable length of tungsten wire wound coiled-coil as it is supported by posts 28 and the terminal posts 23 and 25. This arrangement of the wire, in Fig. 3, may be described as in oppositely directed, laterally spaced reaches. A further detail is depicted in Fig. 4 which shows the wire welded or clamped to a post 28, looking along lines 4—4 in Fig. 3. The wire thus secured, is prevented from vibrating or from having heat conduction therefrom varied.

Figure 5:
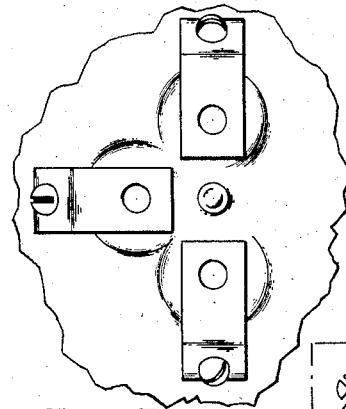
Fig. 5 is a view of a portion of the device in the direction of the arrows 5—5 of Fig. 2.

Fig. 5 discloses further details of the terminal structure on the rear of the bolometer housing as viewed along lines 5—5 in Fig. 2. Screw connections to the terminal posts are clearly illustrated as individually possible from the rear of the unit.

Although target resistance wire 6 is arranged in the bolometer to span the focal center in the plane of the latus rectum of the paraboloidal reflecting surface, compensating resistance wire 7 must be isolated from the radiations to a material extent. This isolation is fundamentally brought about by spacing the compensating element 7 from the target element. It is here taken deep into the reflecting section 20. It could be placed elsewhere within the housing to carry out the objective of isolation.

With the two elements included as a pair of adjacent legs of Wheatstone bridge 8, only the target resistance 6 must be arranged to vary its resistance in accordance with the radiations detected. At the same time, extraneous factors, other than those of received radiation, should be equalized on the two resistance elements in order that, as a unit, the effect upon the variations of the unbalance of bridge 8 will be limited to radiations received by the bolometer. Being located in the same housing, and mounted in similar manner to the same support structure, resistances 6 and 7 will be subjected to substantially the same ambient variations. It has been additionally ascertained, that for many applications, only positional-isolation is satisfactory. For example, the compensating resistance of Fig. 9 can be located between the target resistance and window section and be satisfactorily isolated from the radiation concentration. If the target resistance is arranged to span the focal center in the plane of the latus rectum of the paraboloidal reflecting surface of section 20, the difference in resistance change between the target and compensating resistances, due to radiation entering the bolometer, is sufficiently great to satisfactorily actuate network 8. A portion of the objects of the invention are thereby achieved.

The radiation isolation can be further perfected by placing a physical shield structure 29 between compensating resistance 7 and the radiations directed toward the reflecting section 20. This shield 29 may be formed of any material, with effective radiation reflective properties, such as polished metal.

Figure 6:
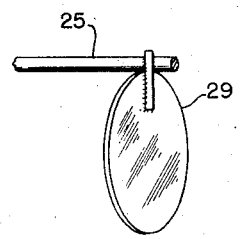
Fig. 6 is a perspective view of the shield and support form of Fig. 2.

Shield 29 is shown in Fig. 2 as mounted on terminal post 25 and between resistances 6 and 7. Fig. 6 illustrates the shield mounting to somewhat better advantage with a perspective view. This shield structure may be given other shapes which may more effectively isolate resistance 7 from stray radiations reflected from section 20. Fig. 7 shows a cup form of shield 30 and Fig. 8 demonstrates how two discs 31 and 32 similar to shield 29 may "sandwich" the element between them. The common purpose of all of these forms is to physically isolate compensating resistance element 7 from radiations brought to the section 20.

Turning now to Fig. 9 there is disclosed a support-shield structure for the resistance wires, somewhat more compact than the other forms heretofore discussed. In Fig. 9 a single lavite structural bridge 33 is supported between posts 23 and 25. This structural support 33 is placed between, and has support posts 28 embedded in opposite sides to simultaneously hold, the reaches of wires 6 and 7 in their respective positions. Target 6 is then held toward the directly impinging, as well as reflected, radiation coming to the bolometer. Therefore, compensating resistance 7 is not only positionally-isolated from the radiation concentration at the focal center but is shielded from direct radiation by the body of bridge 33.

Turning now to Fig. 10, there is shown a shield structure for accomplishing functions beyond the radiation-isolation of a compensating resistance wire. In addition to shielding the compensating resistance, the target is shielded from all but those rays of radiation approaching the bolometer normal to the plane of the latus rectum. This means that the target will be responsive to only that limited area of emissive radiation directly in front of the reflecting section of the bolometer housing.

All rays of radiation normal to the plane of the latus rectum of a paraboloidal reflecting surface are brought to a single point in the plane of the latus rectum. The problem is to expose only a very small portion of the resistance wire target to the radiation concentrated at that point. The structure of Fig. 10 accomplishes this function.

In Fig. 10 is disclosed a reflecting section 40 and a window section 41 forming a bolometer housing similar to that of Fig. 2. A common terminal post 42 and posts 43, 44 are disclosed as mounted in the housing in a manner similar to those associated with the bolometer of Fig. 2. Target resistance 45 and compensating resistance 46 are supported by, and electrically connected to, the terminal posts for external incorporation into a Wheatstone bridge circuit. The physical relationship between the two resistance wires, and their association with radiation shields, is an extension of the prior disclosure.

Shield 47, supported on the end of the terminal posts, is shown as comprised of two sections. The shield is electrically insulated from the post 44 but through a structure at 48 which simultaneously provides thermal conduction. Some form of magnesium oxide can serve this purpose. All of the terminal posts could be given a common heat sink in order to bring the shield structure to a common temperature for uniform thermal exchange with the target and compensation wire elements. Provisions for this temperature uniformity will assist in the minimizing of the external ambient temperature effects on the response of the electric network including the bolometer unit.

The shield 47 prevents direct rays of thermal radiation from reaching either one half of target resistance wire 45 or any portion of compensating resistance wire 46. Compensator 46 is supported from posts 42 and 44 extending into shield 47, and target 45 is suspended halfway inside, extending from the rear, through a central aperture 49 in the shield wall. Aperture 49 is brought very close to the focal point 50 of the reflecting surface of section 40.

Shield 47 is the first portion of the complete shield structure. A second portion is the conical frustum 51, also supported directly from post 42 and electrically insulated from post 44 through 48. This shield is given its particular form to prevent stray rays of radiation from reaching its half of target 45. The angle of its sides align with the circle on the rear of section 40 which defines the internal edge of the active section exposed, around shield 47, to the radiation rays normal to the plane of the latus rectum. Thus the target 45 is thermally shielded from direct and reflected radiations, except that coming to the bolometer parallel to the axis of its reflecting section and concentrated at the focal point 50 in the plane of the latus rectum.

The result of the structural arrangement is to vary the electrical resistance of target 45 in accordance with the intensity of only those radiations which are intercepted by the bolometer unit as they are produced by an emissive body directly in front of its look. Therefore, assurance is given that if the bolometer unit is used as a detector of the temperature of a specific section of a large, heated body, placing the bolometer so it will look at only that section will result in the incorporated network being unbalanced in accordance with the temperature of that limited emissive body area.

Although the improved bolometer of my invention has been specifically illustrated as useful in a circuit for measurement of smoke density, it is not to be regarded as so limited in application. All of the forms disclosed are useful in detection of radiation, regardless of its source. These sources include not only those formed by passing a constant amount of radiation through a variable obstruction but those varying in output of radiation in proportion to their temperature. My invention is actually limited only by the scope of the appended claims.

What I claim as new, and desire to secure by Letters Patent of the United States is:

1. A bolometer of the electric resistance type including, a reflecting structure with an internally mirrored reflecting surface of a paraboloidal shape, a transparent window section joined to the reflecting housing to form an evacuated housing, a resistance wire target mounted within said housing to span the focal center in the plane of the latus rectum, a resistance wire compensator mounted within said housing in positional and radiant isolation from the focal center of radiant concentration, and terminal-supports for the wires in the reflecting structure to provide external electrical connection of the wires into a balanceable electric network.

2. The bolometer of claim 1 including insulating bodies mounted on the terminal supports for support posts for each wire.

3. The bolometer of claim 1 including a common insulating body for the support posts.

4. The bolometer of claim 1 including a reflecting shield supported about the compensator.

5. The bolometer of claim 4 in which the shield comprises two plates arranged one on each side of the compensator.

6. The bolometer of claim 4 in which the shield is shaped to enclose the compensator on at least three sides.

7. The bolometer of claim 4 in which the shield for the target is shaped to expose it to only those radiation rays coming to the reflecting surface along paths normal to the plane of the latus rectum.

8. The bolometer of claim 7 wherein the target is arranged in a path along a parabolic axis and centered at the focal point, and the shield comprises, a first section substantially enclosing the compensator wire and a first half of the target wire, and a second section in the form of a conical frustum about the second half of the target wire.

9. A balanceable network including; a Wheatstone bridge circuit including; (a) a resistance wire target as one leg for receiving variable radiant energy, and (b) a resistance wire compensator as another leg; in combination with, a reflecting structure with an internally mirrored reflecting surface of parabolodial shape; a transparent window section joined to the reflecting housing to form an evacuated housing; and mounting structure within the housing to fix the position of the target so that it spans the focal center of the reflecting structure in the plane of its latus rectum and to fix the position of the compensator in radiant isolation from the center.

10. The network of claim 9 in which the mounting structure includes, an insulating body, terminal supports for the body providing connections to the Wheatstone bridge, and support posts from the insulating body for the target and compensator.

References Cited in the file of this patent

UNITED STATES PATENTS

| 1,979,226 | Hull | Oct. 30, 1934 |
| 2,464,990 | Plagge | Mar. 22, 1949 |
| 2,524,478 | Rutherford et al. | Oct. 3 1950 |
| 2,624,012 | English et al. | Dec. 30, 1952 |